US009230028B1

(12) United States Patent
Gupta et al.

(10) Patent No.: US 9,230,028 B1
(45) Date of Patent: Jan. 5, 2016

(54) DYNAMIC SEARCH SERVICE

(71) Applicant: FMR LLC, Boston, MA (US)

(72) Inventors: Deepak Gupta, Bangalore (IN); Sathish Kumar Chellan, Bangalore (IN); Kannan Ponnusamy, Tamilnadu (IN); Srikara Uplady Manjunatha, Karnataka (IN); Anoop Athreyasa Lakshmisha, Bangalore (IN); Edward L. Francis, III, Norton, MA (US); Christopher Gardiner, Dartmouth, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 14/307,850

(22) Filed: Jun. 18, 2014

(51) Int. Cl.
*G06F 17/30* (2006.01)
(52) U.S. Cl.
CPC .................... *G06F 17/30864* (2013.01)
(58) Field of Classification Search
CPC ............. G06F 17/30106; G06F 17/30864
USPC .......................................................... 707/706
See application file for complete search history.

(56) References Cited

U.S. PATENT DOCUMENTS

| 5,805,911 | A | * | 9/1998 | Miller ........................... 715/234 |
| 5,926,808 | A | * | 7/1999 | Evans et al. |
| 6,006,225 | A | * | 12/1999 | Bowman et al. |
| 6,012,055 | A | * | 1/2000 | Campbell et al. |
| 6,023,695 | A | * | 2/2000 | Osborn et al. |
| 7,363,309 | B1 | * | 4/2008 | Waite et al. |
| 8,868,574 | B2 | * | 10/2014 | Kiang ............... G06F 17/30442 707/754 |
| 2006/0282465 | A1 | * | 12/2006 | Sharma ............. G06F 17/30864 |
| 2007/0214122 | A1 | * | 9/2007 | Bala ....................... G06F 3/0481 |
| 2007/0214250 | A1 | * | 9/2007 | Ahmed .................. G06Q 30/08 709/223 |
| 2007/0214259 | A1 | * | 9/2007 | Ahmed .................. G06Q 30/02 709/224 |
| 2011/0320400 | A1 | * | 12/2011 | Namini ............ G06F 17/30327 707/610 |
| 2012/0023131 | A1 | * | 1/2012 | Downey ........... G06F 17/30038 707/769 |
| 2013/0006985 | A1 | * | 1/2013 | Lee et al. ..................... 707/736 |
| 2014/0019435 | A1 | * | 1/2014 | Ceri .................. G06F 17/30864 707/712 |
| 2014/0046936 | A1 | * | 2/2014 | John ............................ 707/723 |
| 2014/0324879 | A1 | * | 10/2014 | Trease .............. G06F 17/30864 707/741 |

OTHER PUBLICATIONS

Baldonado et al., A User-Centered Interface for Information Exploration in a Heterogeneous Digital Library, Jan. 2000, 14 pages.*

* cited by examiner

*Primary Examiner* — Noosha Arjomandi
(74) *Attorney, Agent, or Firm* — Gesmer Updegrove LLP

(57) ABSTRACT

A platform independent system for performing a search request provided by a user. The platform independent system includes a consuming application executing on a first computer that handles the search request provided by a user. The search request includes instructions to retrieve selected data from a second application. A web interface module executing on a second computer receives the search request and formulates search routines regardless of the search engine logic or infrastructure of the consuming application to connect to a data model that contains the selected data for retrieval. The web interface module structures data associated with the search request to be compatible for searching with the data model.

15 Claims, 9 Drawing Sheets

DYNAMIC SEARCH SERVICE

BACKGROUND OF THE INVENTION

The invention is related to the field of search service, and in particular to a centralized search and ad hoc reporting tool allowing an application to configure a data model for searching.

There are products in market that are focused mainly on the reporting aspect. Products such as OBIEE, SSRS. Many of these products lack features essential to provide transparent capabilities for searching. Moreover, these products are quite cumbersome requiring those of specific technology skills to operate. Given the disparate uses of these products, separate infrastructures are required to operate with separate applications making for inefficient use. This makes it very difficult for cross application data search to be possible as well as integrating with different application style sheets.

SUMMARY OF THE INVENTION

According to one aspect of the invention, there is provided a platform independent system for performing a search request provided by a user. The platform independent system includes a consuming application executing on a first computer, acting as a host server, that handles the search request provided by a user. The search request includes instructions to retrieve selected data from a consuming application. A web interface module executing on the host server receives the search request from the consuming application and formulates search routines regardless of the search engine logic or infrastructure of the consuming application to connect to a data model that contains the selected data for retrieval. The web interface module structures data associated with the search request to be compatible for searching with the data model.

According to another aspect of the invention, there is provided a computer-implemented method that is performed on a computer system. The computer-implemented method includes allowing a user to structure a search request, and handling the search request provided by a user, the search request includes instructions to retrieve selected data from a second application. Moreover, the computer-implemented method includes receiving the search request and formulating search routines regardless of the search engine logic or infrastructure of the consuming application to connect to a data model that contains the selected data for retrieval. The web interface module structures data associated with the search request to be compatible for searching with the data model.

According to another aspect of the invention, there is provided a non-transient computer readable medium containing program instructions for causing a computer to perform a method. The method includes allowing a user to structure a search request, and handling the search request provided by a user, the search request includes instructions to retrieve selected data from a second application. Moreover, the method includes receiving the search request and formulating search routines regardless of the search engine logic or infrastructure of the consuming application to connect to a data model that contains the selected data for retrieval. The web interface module structures data associated with the search request to be compatible for searching with the data model.

DETAILED DESCRIPTION OF THE INVENTION

The invention describes a software platform allowing for the development of a Centralized Search Portal that is platform independent permitting any application to connect to a Data Model for Search in less time without worrying of the Search Engine Logic and Infrastructure. The invention allows a consuming application to configure their Data Model for Searching efficiently. Moreover, the invention can utilize several tools to perform search and reporting on structured and unstructured data. Structured data are the organized data that are stored in database repositories. Un-structured data will be the documents that will be stored in repositories such as Documentum, SharePoint, SAN storages, or the like. The invention allows for reuse, application rationalization, cost efficiency, significant improvement in time to market for application search functionality for any new application, and keeps implementation and annual maintenance costs low.

The invention is highly configurable with other search applications and is compatible with databases, such as Oracle, SQL Server, MY SQL, or the like. Also, the invention is capable of searching against relational and non-relational databases as well as across multiple applications. The search results can be integrated with the consuming application so that application specific actions can be performed on the search results.

Figure 1:
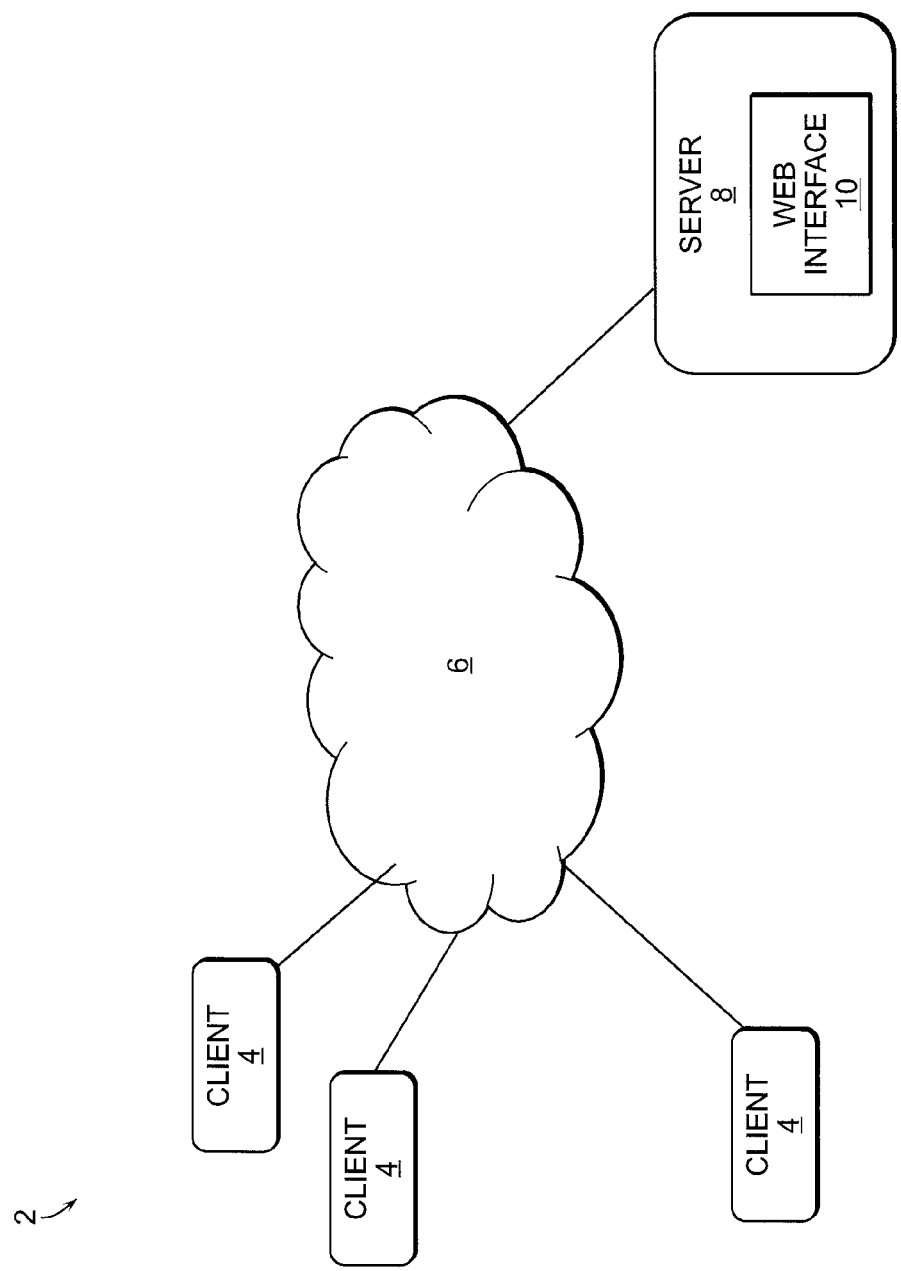
FIG. 1 is a schematic diagram illustrating the network arrangement used in accordance with the invention.

FIG. 1 shows a network arrangement 2 used in accordance with the invention. A number of client computers 4 communicate with a server 8 via the cloud 6. The cloud facilitates communications between client computers 4 and server 8 in the network 2. The invention includes a web interface 10 that is stored in server 8 and executed on a processor. The client computers 4 and server 8 include the necessary network protocols to communicate within the cloud 6. The client computers 4 are executing a number of consuming applications with which the web interface interacts to perform search requests.

The web interface can be developed using Microsoft .Net based technologies that executes on the server 6. It will have two main interfaces, one for administration/configuration and the other for performing the search. This service does not necessitate the consuming application to be on a particular technology. Any containers (like DIV, iFrame, etc.) which can host a web interface can use this service. It will be a device/browser independent application that will provide splendid user experience across different platforms. The end user will have complete control over the search options available and the data transfer does not happen via query string like those in the prior art.

Users who have access to multiple applications shall be provided with an interface with which they can access data from multiple applications at the same time. This will avoid the need to login separately into multiple applications to view their data.

The invention has the capability of reading the data entities and relations from a given schema and proposes a default search configuration which can be edited by the administrators. Notifications will be sent to the administrators when any change in schema is identified.

The invention provides the capability of action based search that comes with a close integration with the consuming application. A unique identifier can be assigned to every row that is shown in the result set in interface. The user can choose one or more rows from the result set and pass it to the consuming application to perform any action. By this way, any application functionalities can be taken on the data that is shown in the result pane in interface.

If a search warrants for return of huge result set, it may open up the risk of choking the data source due to heavy consumption of system resources. It could also result in the user waiting for a long time to see the result set. To alleviate the above constraints, this service will provide the feature where the user initiates the search and the results will be made available to their email, either as excel or .pdf format. The user can also schedule a search so that the result can be received at regular interval of time.

The inventive web interface can receive search criteria in the form of XML. An application which uses the web interface to send feed files based on the criteria set by another application in the form of XML. Based on the XML, the search will be performed and the results will be shared as defined in the configuration. Moreover, shared hosting is provided by the invention that can be either hosted as a shared resource or can be made part of the consuming application itself.

The list of columns this product will make available for the users to conduct search can be restricted based on the roles/permissions that are defined by the consuming application. It can be configured at various levels such as Role based, Permission based or user based access.

The invention provides the opportunity to share and save the search criteria so that user does not find a need to recreate the search every time. Saved criteria can be shared by multiple means (within application, through email, through XML etc.). Security checks can be applied while sharing the Search criteria.

This application will provide the capability to interface with disparate data sources by which search can be conducted across data sources. The styling and layout can be inherited by using the copy of the style sheet that the application uses.

Figure 2:
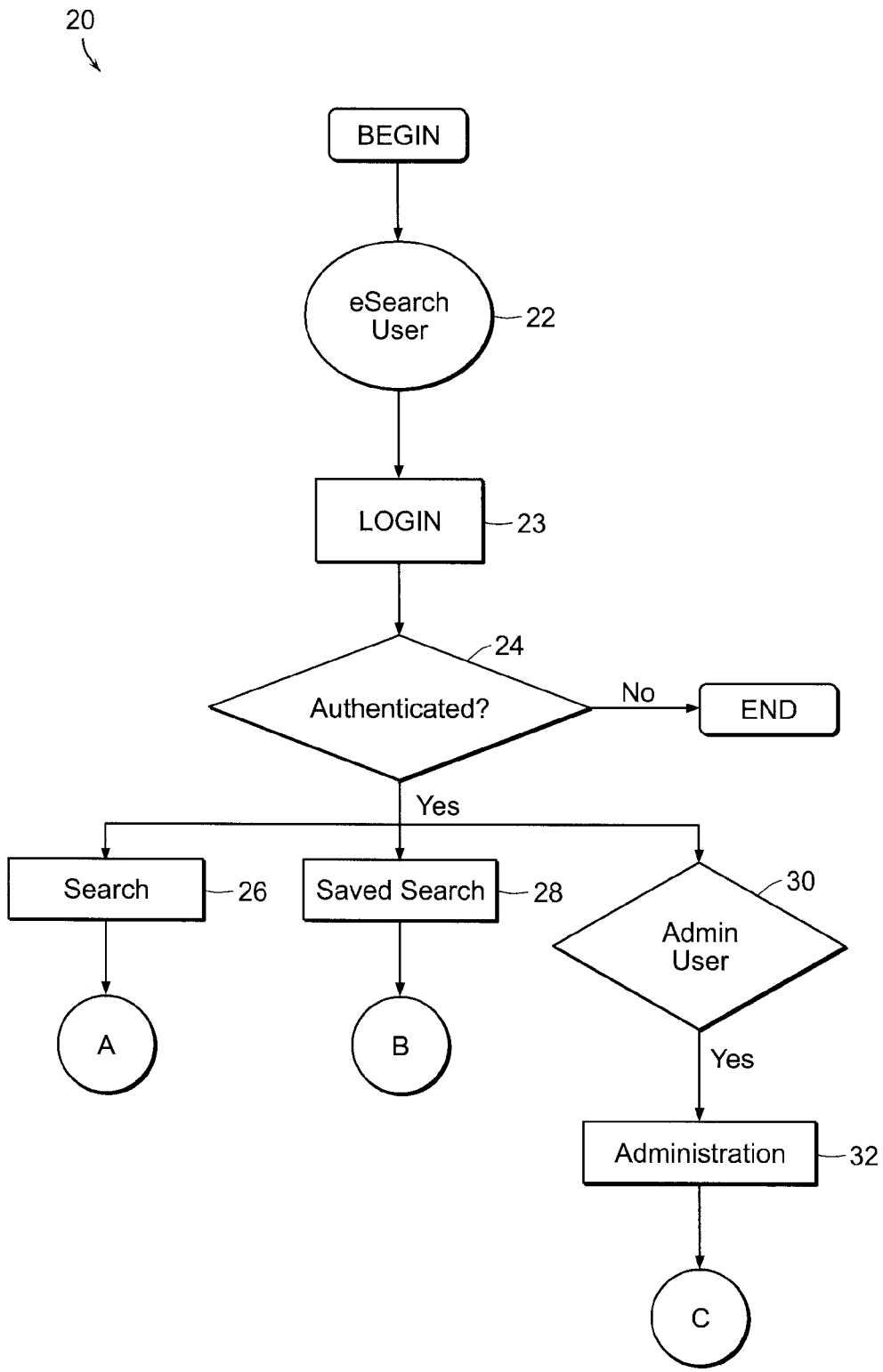
FIG. 2 is a process flowchart illustrating the operation of searching using the inventive web interface in accordance with the invention.

FIG. 2 is process flowchart 20 illustrating the operation of searching using the inventive web interface in accordance with the invention. A user interacts with the web interface via a browser or other application tool, as shown in step 22. The user proceeds to login into the web interface, as shown in step 23, and the web interface includes authentication services that authenticate a user, as shown in step 24. If it is determined that the user is permitted access to the web interface, the user can proceed in doing an active search, as shown in step 26, performed a saved search, as shown in step 28, or login as an administrator as shown in step 30. Otherwise, the authentication service blocks the user from the using the web interface, as shown in step 32.

When an active search is performed more detailed steps are undertaken by steps A as well as when a saved search is performed detailed steps are undertaken by steps B. Moreover, an administrator must further authenticate as an administrator in step 34 before proceeding in performing their respective tasks as shown in step C. Steps A, B, and C are discussed in further detail hereinafter.

Figure 3:
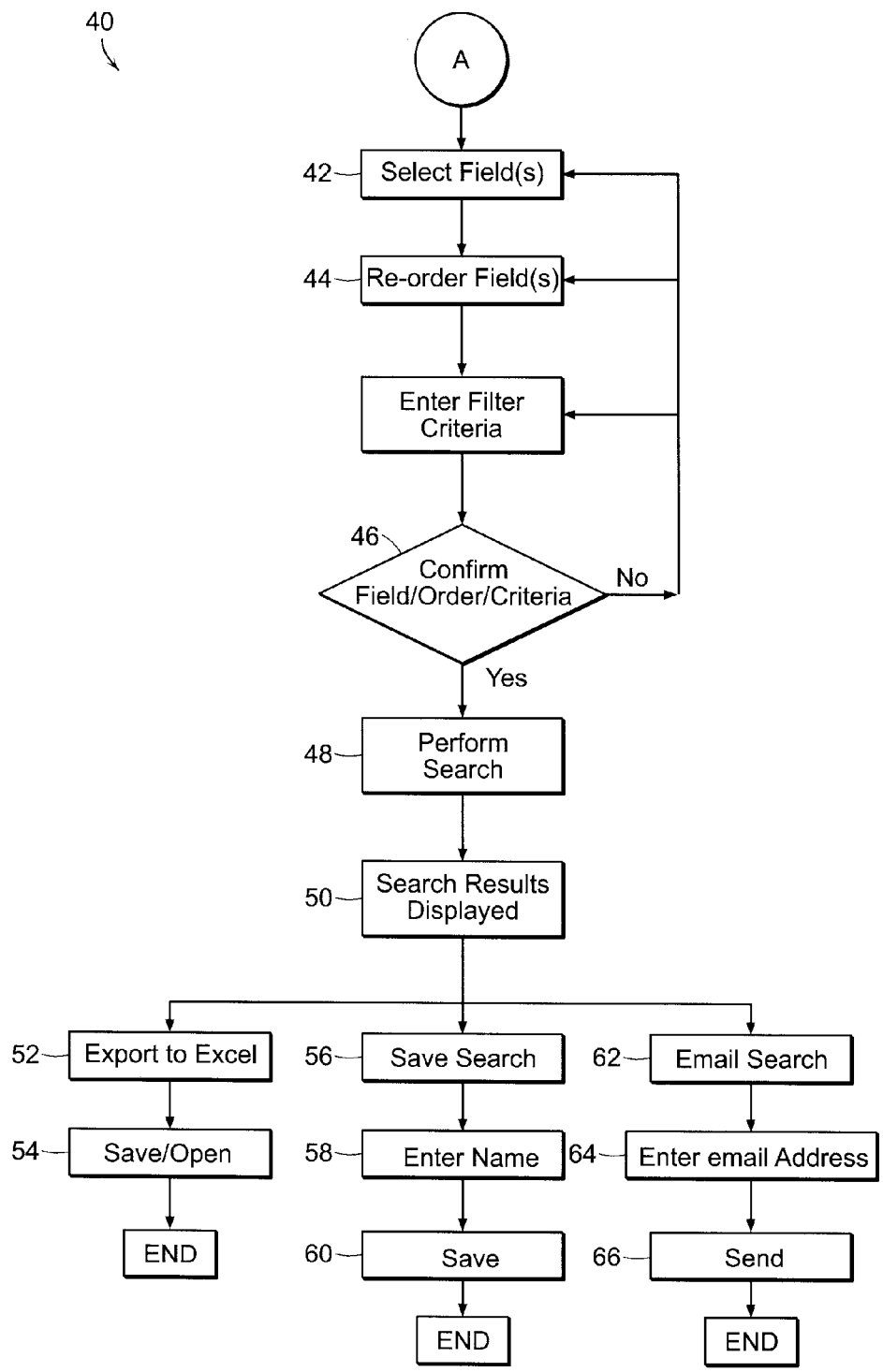
FIG. 3 is a process flowchart illustrating the details steps of performing an active search.

FIG. 3 is process flowchart 40 illustrating the details steps of performing an active search. Note FIG. 3 is similar to step A show in FIG. 2 providing the details of performing an active search. First, a user must select the necessary fields for searching, as shown in step 42, and reorder these fields in step 44 if necessary. Moreover, the user enters filter criteria, as shown in step 46. The user confirms if the selected fields, re-ordered fields, and filter criteria are appropriate, as shown in step 48. If the user affirms the selected fields, re-ordered fields, and filter criteria are correct, the user performs the search, as shown in step 40. Otherwise the user must re-evaluate the selected fields, re-ordered fields, and filter criteria.

After performing the search, the search results are displayed to the user via a user interface in a format pre-selected by the user, as shown in step 50. The user could export the search results to a third party application, such as Excel or the like, as shown in step 52. This includes saving or opening the exported search results for later use. The search results can also be saved for later retrieval, as shown in step 54. The user enters a name to save the search results, as shown in steps 56-60. The user can send via email the search results to a third party, as shown in step 62. The user enters an email address that includes the search results and sends the email to the recipient, as shown in steps 64-66.

Figure 4:
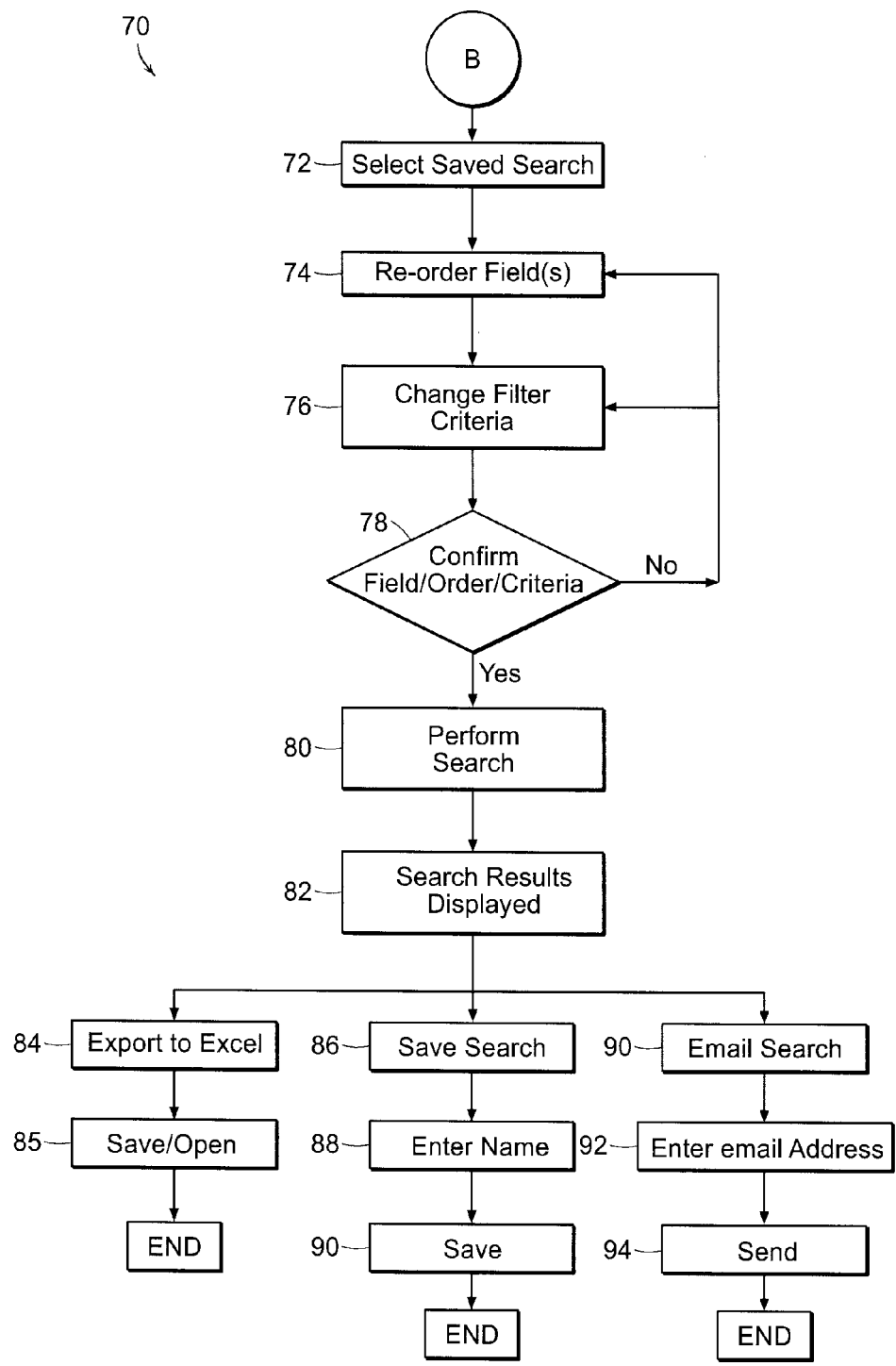
FIG. 4 is a process flowchart illustrating the steps of performing a saved search.

FIG. 4 is a process flowchart illustrating the steps of performing a saved search. Note FIG. 4 is similar to step B show in FIG. 2 providing the details of performing a saved search. First, a user must select a saved search for searching, as shown in step 72, and reorder these fields in step 74 if necessary. This includes retrieving the search result using a name. Moreover, the user enters filter criteria, as shown in step 76. The user confirms if the selected fields, re-ordered fields, and filter criteria are appropriate, as shown in step 78. If the user affirms the selected fields, re-ordered fields, and filter criteria are correct, the user performs the search, as shown in step 80. Otherwise the user must re-evaluate the selected fields, re-ordered fields, and filter criteria.

After performing the search, the search results are displayed to the user via a user interface in a format pre-selected by the user, as shown in step 82. The user could export the search results to a third party application, such as Excel or the like, as shown in step 84. This includes saving or opening the exported search results for later use, as shown in step 85. The search results can also be further saved for later retrieval, as shown in step 86. The user enters a name to save the search results, as shown in steps 88-90. The user can send via email the search results to a third party, as shown in step 92. The user enters an email address that includes the search results and sends the email to the recipient, as shown in steps 94-96.

Figure 5:
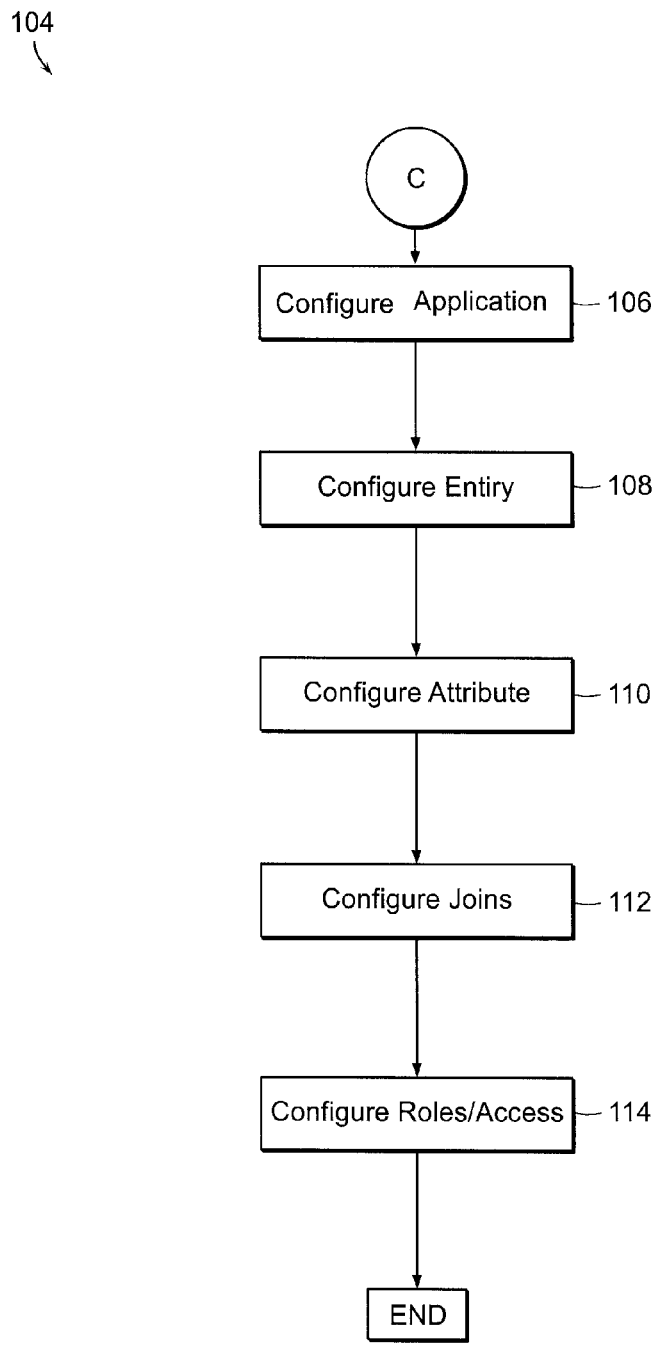
FIG. 5 is a process flowchart illustrating the steps of performing the operations of an administrator.

FIG. 5 is a process flowchart illustrating the steps of performing the operations of an administrator. Note FIG. 4 is similar to step C show in FIG. 2 providing the details of performing administrator functions. Once the administrator is authenticated in step 32 in FIG. 2, the administrator can configure an application to work with the web interface, as shown in step 106. Moreover, the administrator configures the application entry attributes to be compatible with the invention, as shown in step 108. The application's attribute are also configured allowing compatibility with the invention, as shown in step 110. This requires configuring joins and other database operations, as shown in step 112. The administrator is allowed the ability to configure the roles and access of users using the web interface, as shown in step 114.

Figure 6:
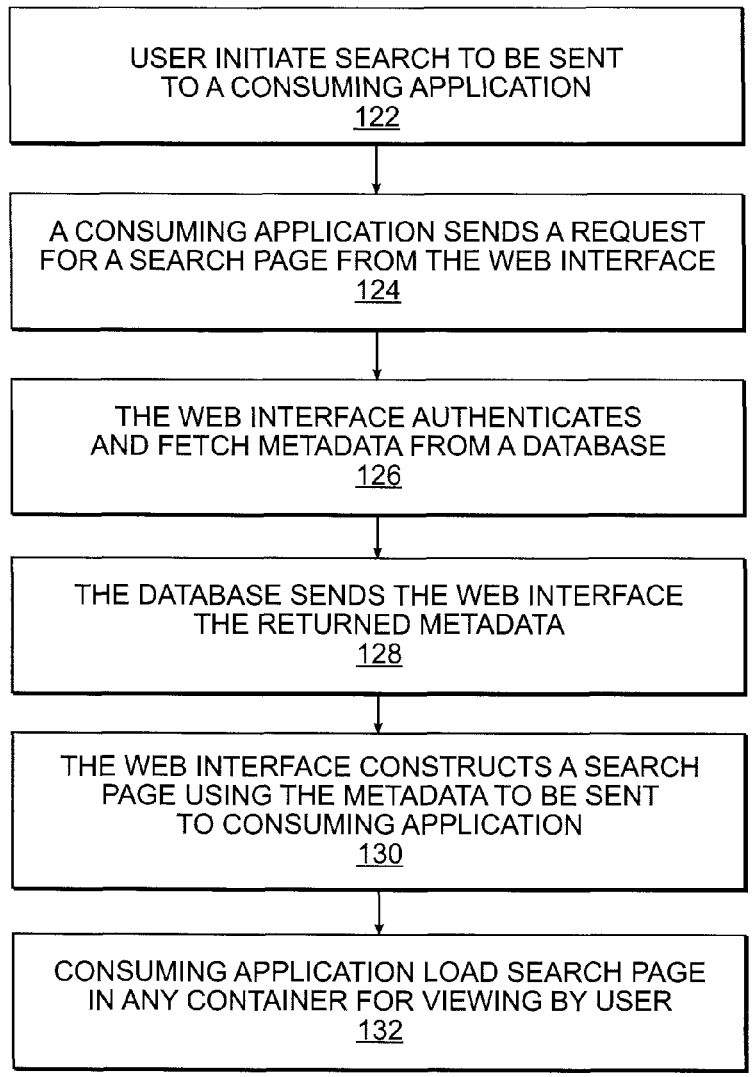
FIG. 6 is a process flowgraph illustrating the inventive web interface in processing a search request.

FIG. 6 is a process flowgraph illustrating the inventive web interface in processing a search request. To initiate searching, a user develops a search request that is received by a consuming application executing on a local machine, as shown in step 122. The consuming application receives the request, formulates a request for a search page to be sent to the web interface, as shown in step 124. The web interface receives the search request. Before processing the search request, it authenticates to evaluate if the search request should be performed. Once an affirmation is provided, it fetches metadata from a database associated with the web interface, as shown in step 126. This might require the web interface to formulate SQL queries to be sent to the database. The database sends the web interface the metadata requested, as shown in step 128. Also, the web interface constructs a search page using the metadata that is sent to the consuming application, as shown in step 130. The consuming application loads the search page in any container for viewing by user, as shown in step 132.

Figure 7:
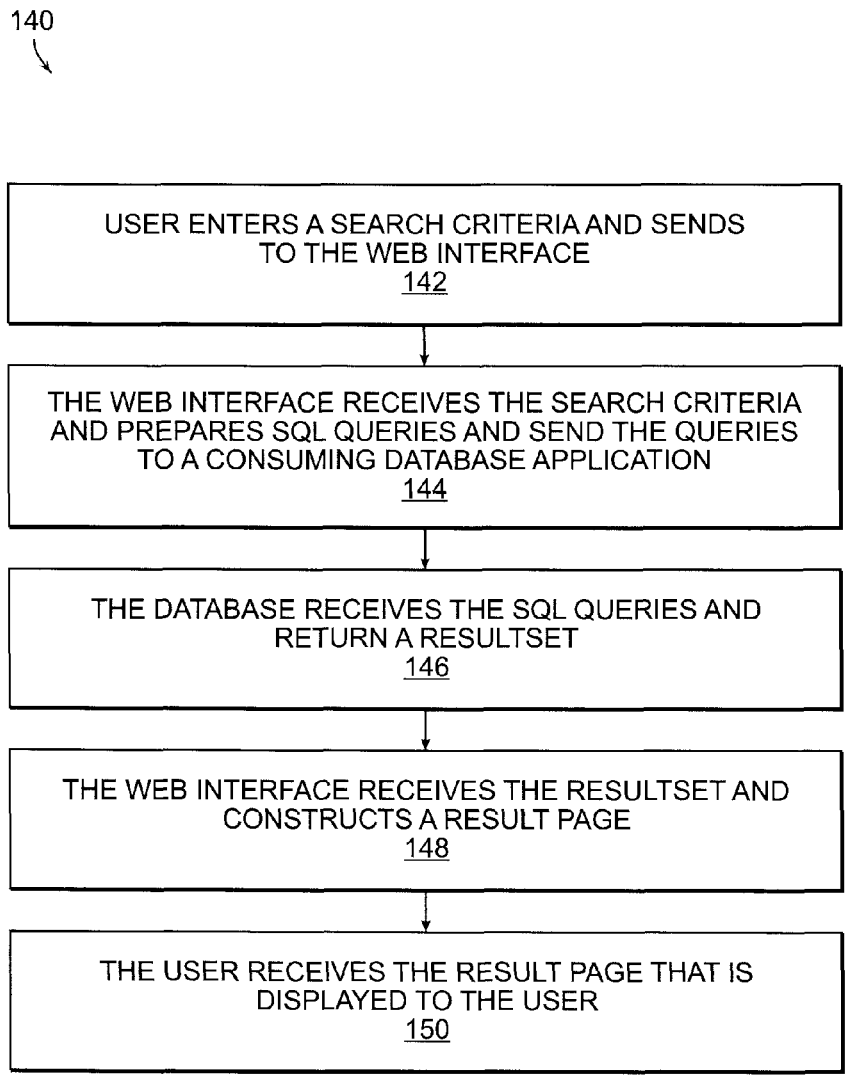
FIG. 7 is a process flowchart illustrating the web interface processing a search request requiring an external database.

FIG. 7 is a process flowchart illustrating the web interface processing a search request requiring an external database. First, the user enters a search criteria and sends the search criteria to the web interface for processing, as shown in step 142. The search criteria can be sent to the web interface as a JSON object. The web interface receives the search criteria and prepares SQL queries, as shown in step 144. The external database receives the SQL queries and processes these SQL queries, as shown in step 146. The results of the queries are delivered to the web interface. The web interface receives the results and constructs a result page, as shown in step 148. The web interface sends the result page to the user. The user receives and displays the results page, as shown in step 150.

Figure 8:
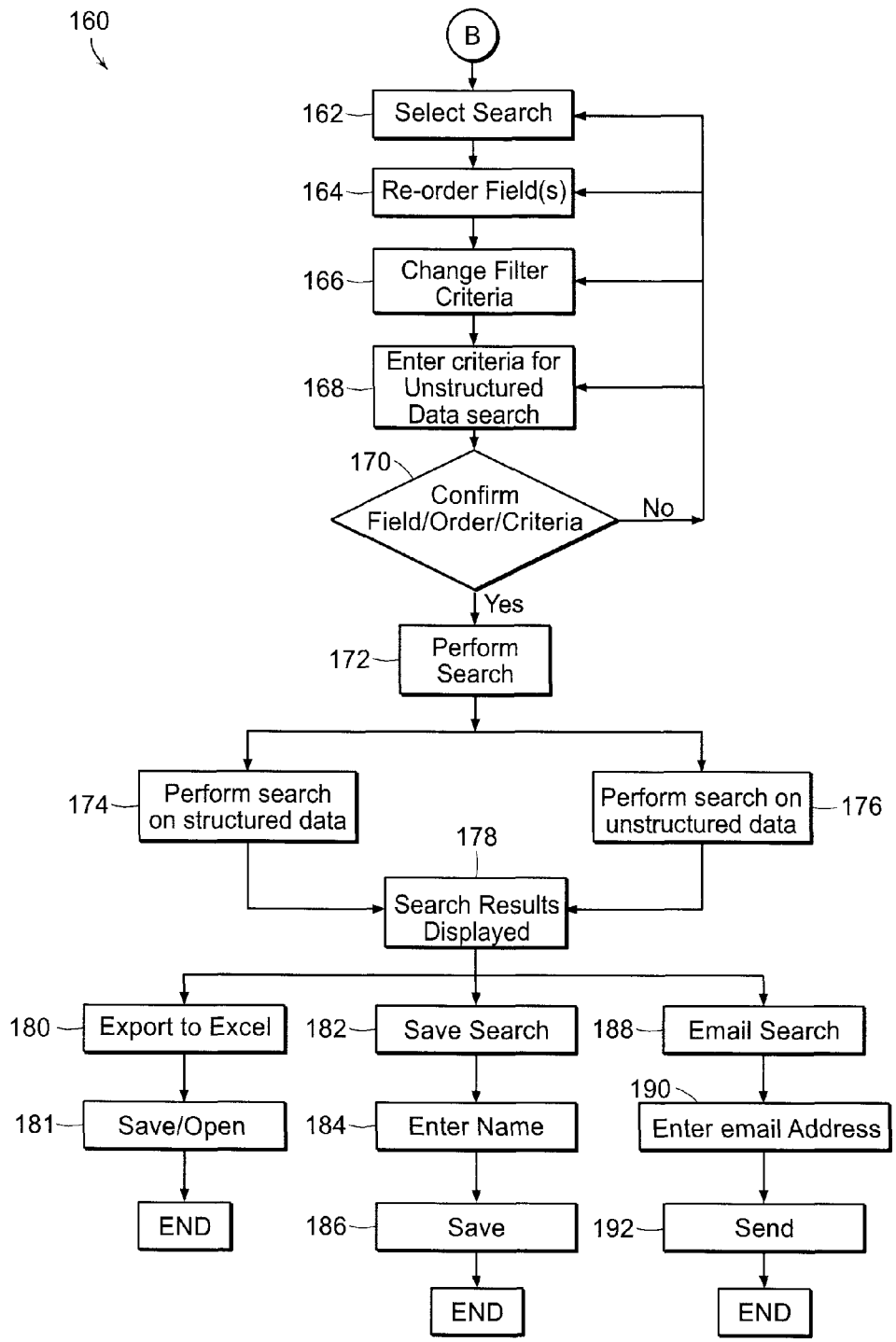
FIG. 8 is a process flowchart illustrating alternative process of performing a saved search.

FIG. 8 is a process flowchart illustrating alternative process of performing a search/report on structured and unstructured data. First, a user must initiate a search as shown in step 162, and reorder these fields in step 164 if necessary. This includes retrieving the search result using a name. Moreover, the user enters filter criteria, as shown in step 166. Moreover, the criteria for an unstructured data search is entered, as shown in step 168. The user confirms if the selected fields, re-ordered fields, and filter criteria are appropriate, as shown in step 170. If the user affirms the selected fields, re-ordered fields, and filter criteria are correct, the user performs the search, as shown in step 172. Otherwise the user must re-evaluate the selected fields, re-ordered fields, and filter criteria.

A determination is made, as shown in steps 174 and 176, with respect to performing a search on structured data or unstructured data.

After performing the search, the search results are displayed to the user via a user interface in a format pre-selected by the user, as shown in step 178. The user could export the search results to a third party application, such as Excel or the like, as shown in step 180. This includes saving or opening the exported search results for later use, as shown in step 181. The search results can also be further saved for later retrieval, as shown in step 182. The user enters a name to save the search results, as shown in steps 184-186. The user can send via email the search results to a third party, as shown in step 188. The user enters an email address that includes the search results and sends the email to the recipient, as shown in steps 190-192.

Figure 9:
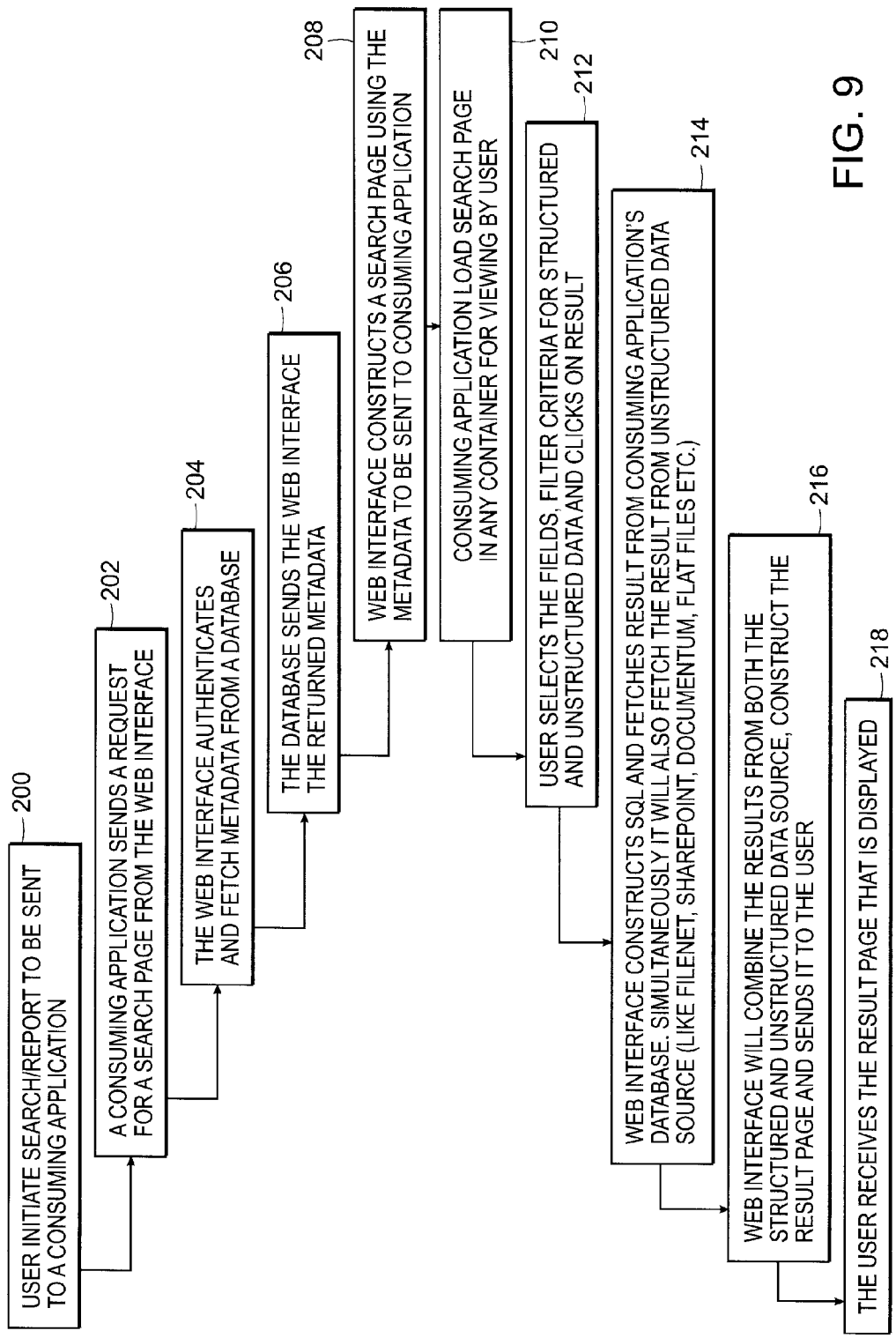
FIG. 9 is a process flow illustrating the steps of processing a search request for either structured and unstructured data.

FIG. 9 is a process flow illustrating the steps of processing a search request for structured and unstructured data. The user initiates a search/report using a web browser where the request is sent to a consuming application, as shown in step 200. The consuming application utilizes a web interface to send a request for a search page, as shown in step 202. The web interface authenticates and fetches the metadata from a database, as shown in step 204, where the database sends metadata to the web interface, as shown in step 206. Afterwards, the web interface constructs a search page using the metadata to be sent to the consuming application, as shown in step 208. The consuming application loads the search page in any container for viewing by a user, as shown in step 210. The fields and filter criteria for structure and unstructured data are selected by the user, as shown in step 212. The web interface constructs SQL statements and fetches result from the consuming application's database simultaneously while fetching the result from unstructured data source (such as filenet, sharepoint, documentum, flat files etc.), as shown in step 214. The results are combined by the web interface using both the structured and unstructured data source. The result page is constructed and sent to the user, as shown in step 216. The user received the result page that is displayed, as shown in step 218.

Although the present invention has been shown and described with respect to several preferred embodiments thereof, various changes, omissions and additions to the form and detail thereof, may be made therein, without departing from the spirit and scope of the invention.

What is claimed is:

1. A platform independent system for performing a search request provided by a user comprising:
 a consuming application executing on a first computer handles the search request provided by a user, the search request includes instructions to retrieve selected data from a second application; and
 a web interface module executing on a second computer receives the search request and formulates search routines regardless of the search engine logic or infrastructure of the consuming application to connect to a data model that contains the selected data for retrieval, the web interface module structures data associated with the search request to be compatible for searching with the data model, the selected data from the data model includes structured data and un-structured data where the web interface module is capable of accessing disparate databases and applications for devising the search request, wherein the user is provided the flexibility to perform a search on a plurality of attributes simultaneously in a single request, the users also have an option to select or modify any number of search attributes for either display or filter purpose or both, the web interface module fetches the results from a structured data source while simultaneously fetching results from an un-structured data source; wherein the web interface formulate queries based on the user selected attributes and filter criteria to retrieve the un-structured data that are stored in a third party repositories; and
 wherein the web interface retrieves the selected data from the third party repository and constructs a result page using the selected data.

2. The platform independent system of claim 1, wherein the web interface formulates queries based on the user selected attributes and filter criteria to retrieve the structured data that are stored in database repositories.

3. The platform independent system of claim 1, wherein the web interface retrieves the result set from both the structured and the un-structured data repositories and constructs a result page.

4. The platform independent system of claim 3, wherein the consuming application receives the result page and loads the result page in a container for viewing by the user.

5. The platform independent system of claim 1, wherein the web interface sends to the user the result page for viewing.

6. A computer-implemented method that is performed on a computer system, the computer-implemented method comprises:

allowing a user to structure a search request;

handling the search request provided by a user, the search request includes instructions to retrieve selected data from a second application; and receiving the search request and formulating search routines regardless of the search engine logic or infrastructure of the consuming application to connect to a data model that contains the selected data for retrieval, the web interface module structures data associated with the search request to be compatible for searching with the data model, the selected data from the data model includes structured data and unstructured data where the web interface module is capable of accessing disparate databases and applications for devising the search request, wherein the user is provided the flexibility to perform a search on a plurality of attributes simultaneously in a single request, the users also have an option to select or modify any number of search attributes for either display or filter purpose or both, the web interface module fetches the results from a structured data source while simultaneously fetching results from an un-structured data source;

wherein the web interface formulate queries based on the user selected attributes and filter criteria to retrieve the un-structured data that are stored in a third party repositories; and wherein the web interface retrieves the selected data from the third party repository and constructs a result page using the selected data.

7. The computer-implemented method of claim 6, wherein the web interface formulates queries based on the user selected attributes and filter criteria to retrieve the structured data that are stored in database repositories.

8. The computer-implemented method of claim 6, wherein the web interface retrieves the result set from both the structured and the un-structured data repositories and constructs a result page.

9. The computer-implemented method of claim 8, wherein the consuming application receives the result page and loads the result page in a container for viewing by the user.

10. The computer-implemented method of claim 8, wherein the web interface sends to the user the result page for viewing.

11. A non-transient computer readable medium containing program instructions for causing a computer to perform a method of:

allowing a user to structure a search request;

handling the search request provided by a user, the search request includes instructions to retrieve selected data from a second application; and receiving the search request and formulating search routines regardless of the search engine logic or infrastructure of the consuming application to connect to a data model that contains the selected data for retrieval, the web interface module structures data associated with the search request to be compatible for searching with the data model, the selected data from the data model includes structured data and unstructured data where the web interface module is capable of accessing disparate databases and applications for devising the search request, wherein the user is provided the flexibility to perform a search on a plurality of attributes simultaneously in a single request, the users also have an option to select or modify any number of search attributes for either display or filter purpose or both, the web interface module fetches the results from a structured data source while simultaneously fetching results from an un-structured data source;

wherein the web interface formulate queries based on the user selected attributes and filter criteria to retrieve the un-structured data that are stored in a third party repositories; and wherein the web interface retrieves the selected data from the third party repository and constructs a result page using the selected data.

12. The non-transient computer readable medium of claim 11, wherein the web interface formulates queries based on the user selected attributes and filter criteria to retrieve the structured data that are stored in database repositories.

13. The non-transient computer readable medium of claim 11, wherein the web interface retrieves the result set from both the structured and the un-structured data repositories and constructs a result page.

14. The non-transient computer readable medium of claim 13, wherein the consuming application receives the result page and loads the result page in a container for viewing by the user.

15. The non-transient computer readable medium of claim 11, wherein the web interface sends to the user the result page for viewing.

* * * * *